United States Patent [19]
Wilson et al.

[11] Patent Number: 6,041,361
[45] Date of Patent: Mar. 21, 2000

[54] DIGITAL VIDEO RECORDER PROVIDING SEPARATE PIPELINING FOR ODD AND EVEN FIELDS FROM A SINGLE CAMERA

[75] Inventors: Charles Park Wilson, Santee; Gerhard Josef Winter; David Ross MacCormack, both of San Diego, all of Calif.

[73] Assignee: Sensormatic Electronics Corporation, Boca Raton, Fla.

[21] Appl. No.: 09/067,991

[22] Filed: Apr. 29, 1998

Related U.S. Application Data

[63] Continuation-in-part of application No. 08/741,983, Oct. 31, 1996, Pat. No. 5,854,902.

[51] Int. Cl.[7] .................................................. H04N 9/79
[52] U.S. Cl. ........................................ 709/253; 709/266
[58] Field of Search .................................. 709/261, 266, 709/268, 277

[56] References Cited

U.S. PATENT DOCUMENTS

| 5,724,475 | 3/1998 | Kirsten | 386/109 |
| 5,909,511 | 6/1999 | Yoshimoto | 382/236 |
| 5,909,548 | 6/1999 | Klein et al. | 340/825.06 |
| 5,917,958 | 6/1999 | Nunally et al. | 382/276 |
| 5,933,534 | 8/1999 | Yoshimoto et al. | 382/236 |

*Primary Examiner*—Thomas R. Peeso
*Attorney, Agent, or Firm*—Robin, Blecker & Daley

[57] ABSTRACT

A video data recording unit receives input video signal streams from up to 16 cameras. The signal streams are selectively converted into digital video signals and are stored on a data storage device such as a hard disk. The apparatus is controlled so that both odd and even signal fields generated by at least one camera are recorded, whereas only odd fields or only even fields generated by the other cameras are recorded. Odd and even signal field streams may be derived from a single stream of demodulated video signals, or from respective demodulation streams.

18 Claims, 11 Drawing Sheets

DIGITAL VIDEO RECORDER PROVIDING SEPARATE PIPELINING FOR ODD AND EVEN FIELDS FROM A SINGLE CAMERA

CROSS-REFERENCE TO RELATED APPLICATION

This application is a continuation-in-part of prior application Ser. No. 08/741,983, filed Oct. 31, 1996 now U.S. Pat. No. 5,854,902. The disclosure of the parent application, Ser. No. 08/741,983, is incorporated herein by reference. Also to be noted is another related application, Ser. No. 08/729,620, also filed Oct. 31, 1996 (for which the issue fee has been paid), now U.S. Pat. No. 5,822,542.

BACKGROUND OF THE INVENTION

The above-referenced parent patent application discloses a digital video recorder which has intelligent video information management capabilities.

In any digital video recording apparatus, the large quantity of data inherently present in streams of video signals tends to require difficult trade-offs to be made between the storage capacity to be provided by the apparatus and the image quality to be available upon reproduction of the recorded video signals. The trade-offs can be particularly critical when it is desired to provide random-access to the recorded video signal, as is the case in the intelligent video information management (IVIM) recorder disclosed in the parent patent application. In a preferred embodiment of the IVIM recorder, recording of video signal streams generated by up to 16 cameras, with random access playback, is provided on one or more hard disk drives. To achieve an adequate recording duration on the hard disk drives, a number of compression strategies were proposed in the parent patent application. Given that the IVIM recorder was intended principally for application in video surveillance security systems, it was considered that a standard recording format corresponding to 240 lines of vertical resolution would provide reproduced signal quality that was adequate for the intended application, while substantially increasing the effective recording capacity relative to the NTSC standard of about 480 horizontal scanning lines.

However, it would be desirable in the IVIM system to provide flexibility so that the user can determine, in selected cases, to trade off recording capacity in favor of improved vertical resolution in the recorded image signal.

OBJECTS AND SUMMARY OF THE INVENTION

It is accordingly an object of the invention to provide a digital video recorder with intelligent video information management capabilities and user-selectable image resolution options.

According to an aspect of the invention, there is provided an apparatus for storing video signals, including a first video camera, a second video camera, a conversion circuit, connected to the video cameras, for selectively converting video signals generated by the video cameras into digital video signals, a storage device, connected to the conversion circuit, for storing the digital video signals, and a control circuit, connected to the conversion circuit and the storage device, for controlling the conversion circuit and the storage device, wherein the video cameras each generate video signals according to an interlaced video signal standard in which the cameras each alternately generate odd signal fields and even signal fields, the odd signal fields corresponding to odd-numbered horizontal scan lines of an image plane and the even signal fields corresponding to even-numbered horizontal scan lines of the image plane, with the control circuit controlling the conversion circuit and the storage device so that the storage device stores digital video signals representing both odd and even signal fields generated by the first camera and the storage device also stores only one of (a) digital video signals representing exclusively odd signal fields generated by the second video camera, and (b) digital video signals representing exclusively even signal fields generated by the second video camera.

According to another aspect of the invention, there is provided a method of operating a digital video signal storage device, the device being connected to a plurality of video cameras, the cameras each generating video signals corresponding to an image plane, the method including the steps of storing in the storage device first digital signals representing video signals generated by a first one of the video cameras, the first digital signals providing a vertical resolution for the image plane corresponding to a first number of horizontal scan lines, storing in the storage device second digital signals representing video signals generated by a second one of the video cameras, the second digital signals providing a vertical resolution for the image plane corresponding to a second number of horizontal scan lines that is substantially one-half of the first number of scan lines, and refraining from storing in the storage device any digital signal corresponding to video signals generated by the second one of the video cameras, other than the second digital signals. Thus, according to the latter aspect of the invention, one camera is recorded with full vertical resolution (e.g. 480 lines) while a second camera is recorded at essentially half vertical resolution (240 horizontal scanning lines).

DESCRIPTION OF PREFERRED EMBODIMENTS

Figure 1:
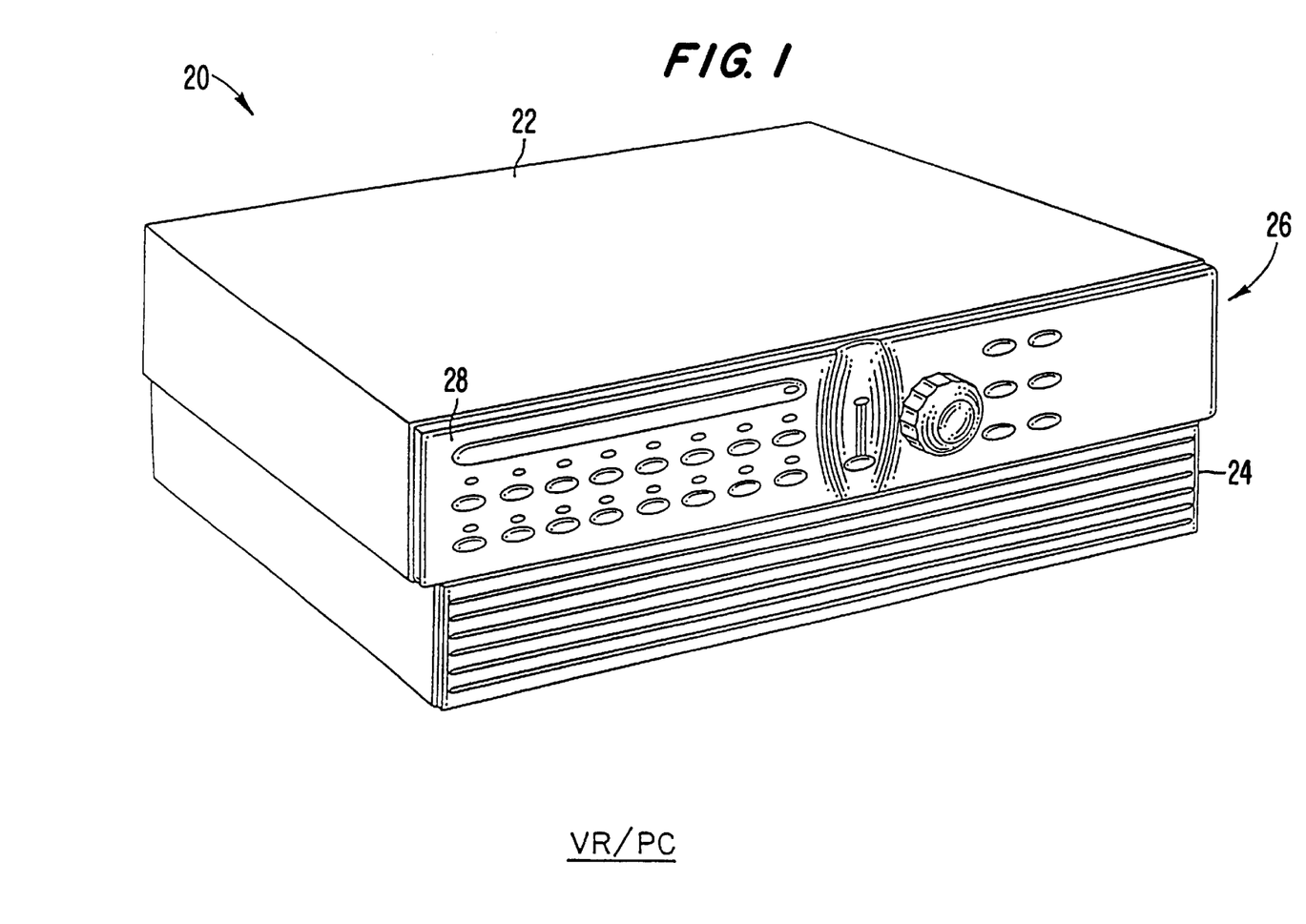
FIG. 1 is a perspective view of a video recording/personal computer (VR/PC) unit provided in accordance with the invention.

FIG. 1 is a perspective view of an integrated device which combines digital video recording, random access retrieval of recorded video data, and user-friendly personal computer based functionality. Reference numeral 20 generally indicates the integrated unit, which may be referred to as a video recording/personal computer or "VR/PC" unit. The VR/PC unit is adapted to receive streams of video signals generated by one or more video cameras. A preferred embodiment is configured to receive simultaneous input from 16 cameras (which are not shown in FIG. 1). The VR/PC unit also provides an output video signal, either live from one or more video cameras, or reproduced from video data storage facilities provided within the VR/PC unit, to drive one or more display monitors, which also are not shown in FIG. 1.

The internal components of the VR/PC unit 20 are contained within a molded plastic housing 22. As will be seen, the internal components include control and signal processing circuitry, as well as a number of data recording devices. For example, integrated within the VR/PC unit there are preferably two or more fixed or "hard" data recording drives of the magnetic type, as well as at least one drive for a removable data storage medium. A preferred embodiment includes both a floppy disk drive and a digital audio tape (DAT) drive. The floppy drive may be used for loading software programs; the DAT drive may be used to store video data, retrieved from the internal hard drives, for permanent or archival storage on a magnetic tape formatted in accordance with the standard DAT format. Access to the removable medium drives (which are not shown in the drawing) may be had via a hinged dust-shield 24 provided at a front elevation 26 of the housing 22. Also provided at the front elevation 26 is a front panel 28 on which a plurality of switches are mounted. The switches permit the user to control various functions such as selecting input cameras for recording, setting a format for a displayed video signal, and controlling playback operations.

A commercial embodiment of a VR/PC unit, of a type in which the present invention may suitably be applied, is currently being sold under the trademark "INTELLEX" by the assignee of the present invention, Sensormatic Electronics Corporation, Boca Raton, Fl.

Figure 2:
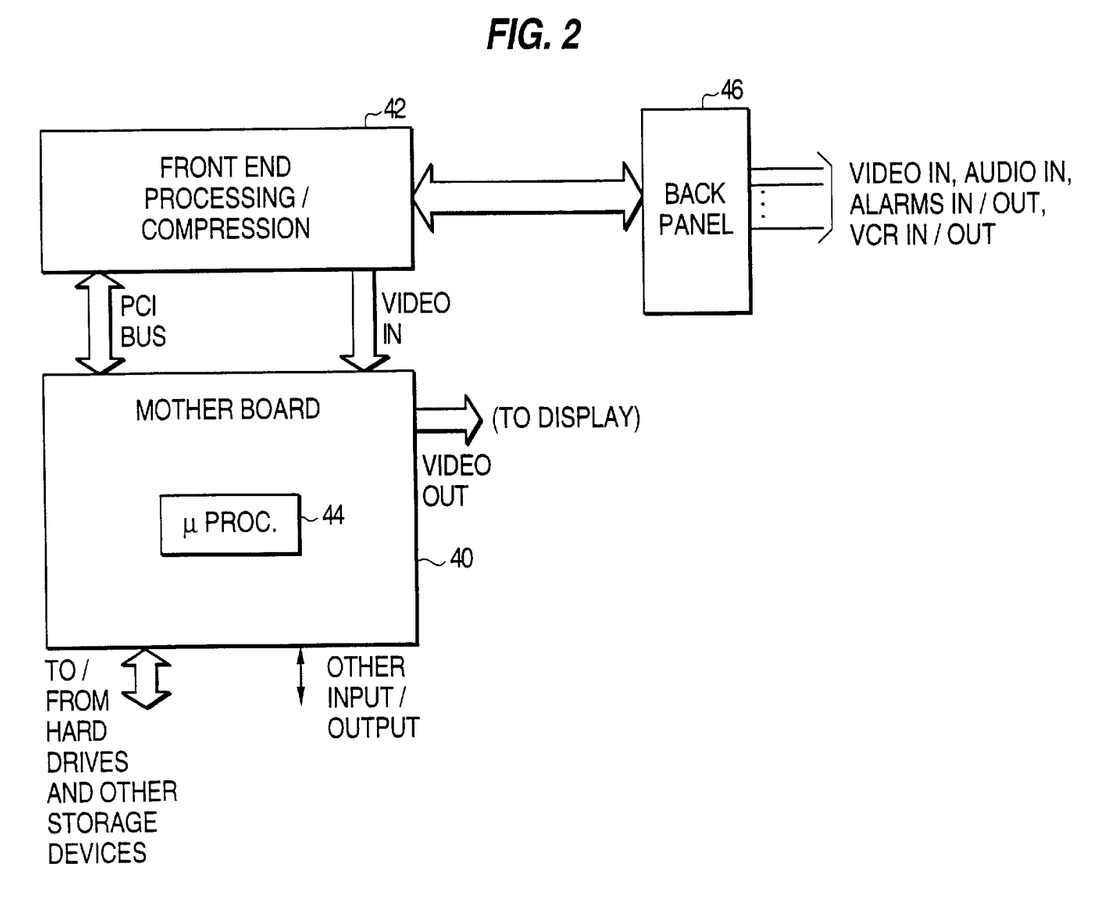
FIG. 2 is a summary block diagram of electronic components of the VR/PC unit of FIG. 1.

An overview of the internal components of the VR/PC unit will now be provided, with reference to FIG. 2. As seen from FIG. 2, primary components include a motherboard 40 and front end processing/compression electronics 42.

The motherboard 40 provides the overall intelligence and control for the VR/PC unit. Preferably, the motherboard 40 is constructed in accordance with conventional architecture for personal computer motherboards. The central processing unit for the motherboard is preferably constituted by a conventional microprocessor 44, which may, for example, be one of the models of the well known Pentium line of microprocessors.

The motherboard 40 controls, and exchanges data with, data storage devices such as the above-mentioned hard disk drives, DAT drive and floppy disk drive. The motherboard is also adapted to receive user control signals, which may be input via the front panel 28 (FIG. 1) or via conventional user input devices (not shown) such as a mouse and/or a keyboard. The motherboard 40 also exchanges data with the front end processing/compression electronics 42 while receiving an input digital video signal from the front end electronics 42, and providing an output video signal to a display monitor, which is not explicitly shown in FIG. 2.

It should be understood that the motherboard 40 includes conventional features such as program memory, working memory, input and output data communication ports, data signal bus connections, interfaces for recording medium drives, and video interface ports. All of these may be of conventional construction.

The front end electronics 42 provide signal processing with respect to input video signals received via a back panel 46. The arrangement of the front end electronics 42 may be like that incorporated in the above-mentioned INTELLEX video recorder and/or as disclosed in the above-referenced parent patent application.

Figure 3:
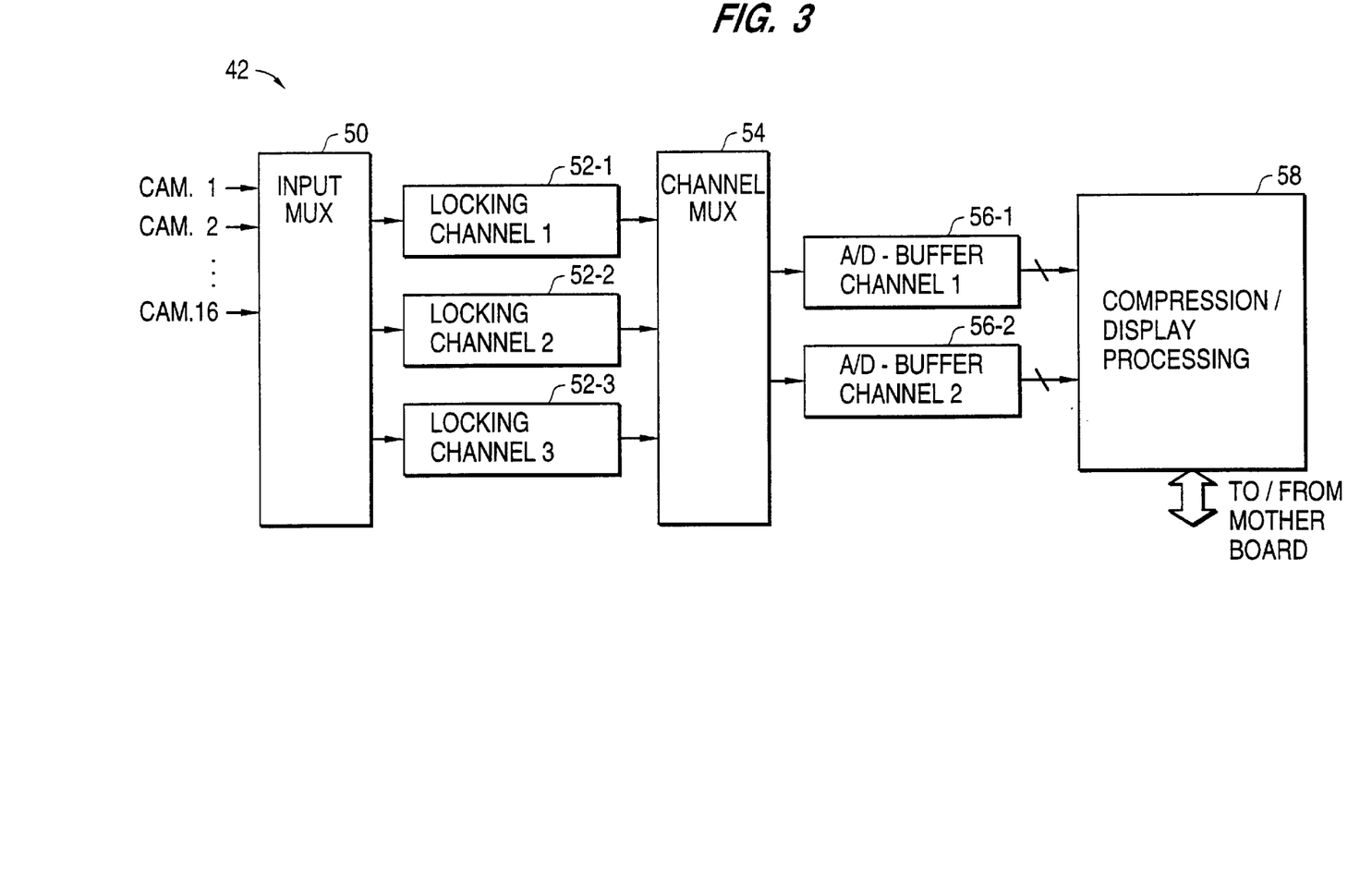
FIG. 3 is a summary block diagram representation of a front end processing/compression component shown in FIG. 2.

Certain features of the front end electronics 42 are schematically illustrated in FIG. 3. At the input side of the front end electronics 42 is a multiplexer 50 which selects ones of the input camera streams for recording and/or display by the VR/PC unit. Any one of the input video signal streams may be assigned to any one of three video signal locking channels 52-1, 52-2 and 52-3. At the output side of the signal locking channels, a channel-selection multiplexer 54 is arranged to assign any one of the three signal locking channels to either one of two signal conversion and buffering channels 56-1 and 56-2. The signal conversion and buffering channels are provided to convert the selected stream of analog video signals into a sequence of digital video data. The resulting digital video data is then subjected to further processing, including data compression, as indicated at 58 in FIG. 3. The processed data is then made available for storage via the motherboard and/or for display.

Alternative recording and playback strategies that may be employed in the VR/PC unit will now be described with reference to FIGS. 4–7C.

Figure 4:
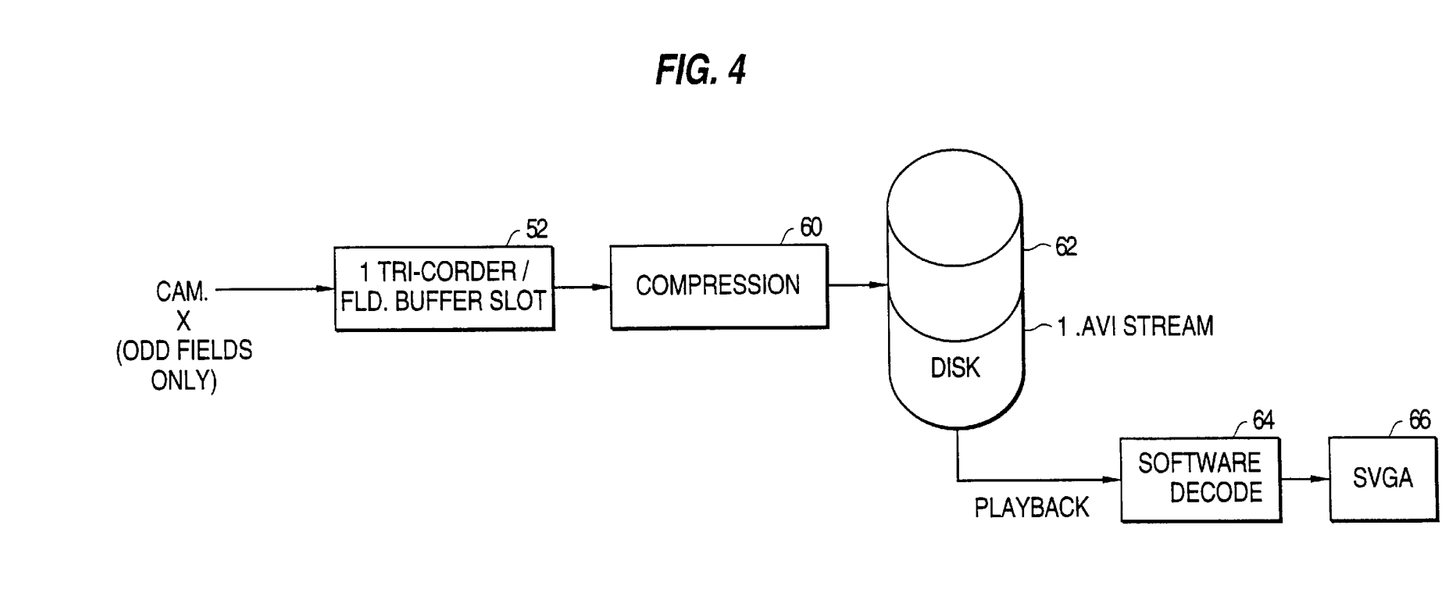
FIG. 4 schematically illustrates low-resolution video data storage and playback operations in the VR/PC unit.
Figure 7A:
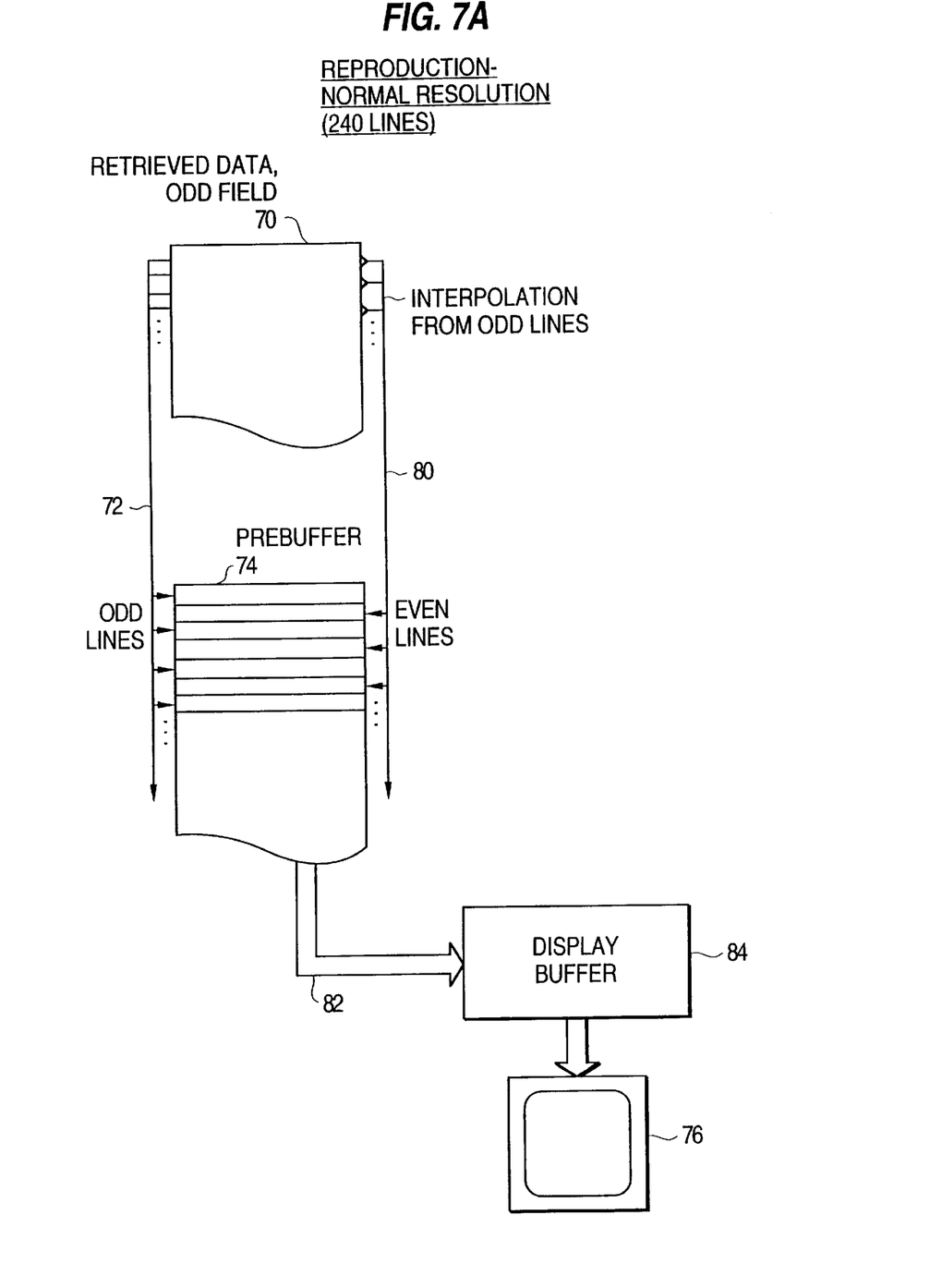
FIG. 7A is a schematic illustration of a low-resolution playback operation.

A first alternative, schematically illustrated in FIGS. 4 and 7A, maximizes the recording capacity of the unit while facilitating recording of simultaneous streams of video signals from a maximum number of the cameras connected to the recording unit. However, this alternative provides only 240 lines of vertical resolution per image, roughly one-half of the commercial broadcast standard (NTSC). Nevertheless, it has been found that, with interpolation to produce 480 lines, the vertical resolution is at least adequate for video surveillance applications.

In the technique shown in FIG. 4, a "tri-corder" and field buffering slot 52 (which corresponds to one of the three field locking channels 52-1, 52-2 and 52-3 of FIG. 3, plus an assigned signal conversion and buffering channel) is assigned at a given time to a video signal field generated by camera X. The front end electronics 42 are operated, under control of the motherboard, so that only odd fields are captured from camera X to minimize jitter, and to facilitate machine-based video data content analysis and/or inter-field video data compression processing. The captured field from camera X is then pipelined for digitization and compression (as indicated at 60) and relayed through the motherboard for storage on a hard disk drive 62 in the form of a single data stream, according to an audio-video-interleave (AVI) format.

The front end electronics may be operated so that every odd video signal field generated by camera X is captured, digitized, compressed or recorded. Alternatively, camera X may be included in a sequence of other cameras which are also selected for recording by the front end electronics, so that odd fields at certain intervals are recorded to form the camera X video signal stream recorded on the disk 62. (It should also be understood that recording only of even fields from camera X, rather than odd fields, may be implemented.)

When playback of the stream of images generated by camera X is requested, the corresponding AVI stream is reproduced from the disk 62, under control of the motherboard. The reproduced signal stream is then software decoded (decompressed) at the motherboard, as functionally represented by block 64, and then is used to drive an SVGA monitor, as functionally represented at block 66.

FIG. 7A schematically illustrates some of the processing carried out at blocks 64 and 66 in FIG. 4. Referring to FIG. 7A, the odd video signal field data represented by reference numeral 70 is used directly (as indicated at 72) to fill memory locations in a pre-display buffer 74 which correspond to the odd-numbered horizontal scanning lines of a display monitor 76. The retrieved odd field data 70 is also subjected to interpolation (indicated at 80) and the resulting interpolated data is used to fill memory locations in pre-buffer 74 which correspond to the even-numbered horizontal scanning lines of the display monitor 76. The interpolation represented by step 80 may be performed in software or via suitable hardware, such as an interpolation filter (not shown). According to a preferred form of the interpolation, each pixel in the even-numbered scanning lines is calculated as the arithmetic mean of the corresponding two pixels found in the odd-numbered lines that are immediately above and immediately below the even-line pixel to be generated.

When both the odd and even lines of the pre-buffer 74 have been filled, the data from the pre-buffer 74 is transferred in a mass data transfer mode (indicated at 82) to a display buffer 84. The data in the display buffer 84 is then used to drive the display monitor 76.

Figure 5:
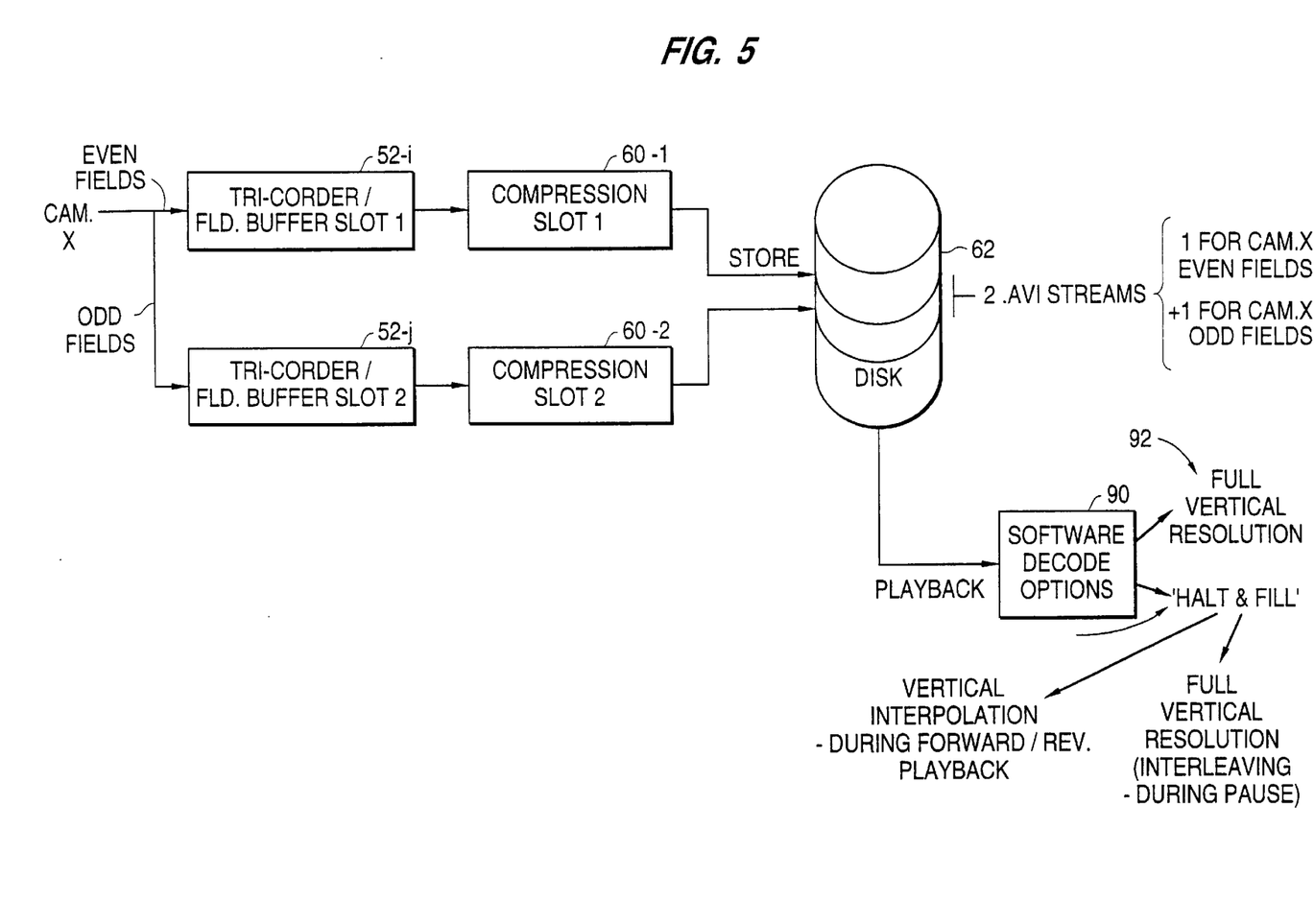
FIGS. 5 and 6 respectively represent alternative high-resolution video data storage and playback techniques that may be carried out in the VR/PC unit.

FIG. 5 illustrates an alternative technique, in which the VR/PC unit is operated to provide a vertical display resolution which essentially corresponds to commercial broadcasting television standards for one camera, but at the cost of greatly reducing the recording bandwidth available for other cameras that may be connected to the VR/PC unit. According to this technique, even fields of the camera X are pipelined, through a field locking/buffering slot and a compression slot, for storage as a first AVI stream on the disk 62, while the odd fields generated by camera X are separately pipelined for storage as a separate AVI stream on the disk 62. The recording unit may be operated so that every field of camera X is stored, or so that sequential field pairs made up of an even field and an odd field are captured with regard to camera X, with the pairs of camera X fields interspersed among fields generated by one or more other cameras connected to the recording unit.

Figure 6:
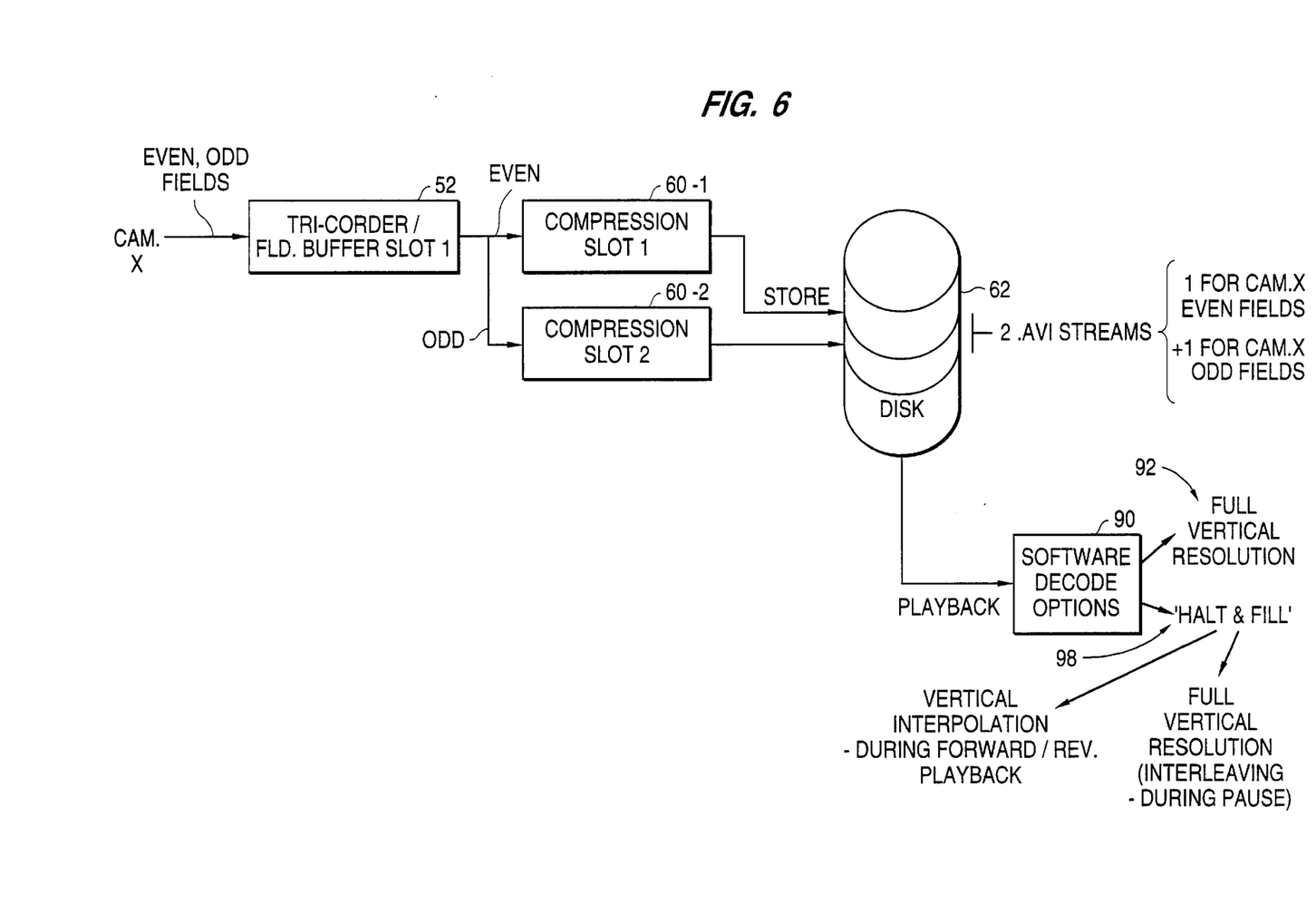

According to another alternative, illustrated in FIG. 6, a single field locking/buffering slot is used to capture the two fields in each sequential pair (or all of the fields) generated by camera X and then the odd and even fields are separately pipelined beginning with the compression slots and are again stored as separate streams on the disk 62. The technique of FIG. 6 is preferred in comparison to that of FIG. 5 in that it makes more efficient use of the available field locking channels.

Regardless of whether the technique of FIG. 5 or that of FIG. 6 is employed, the same playback options are available, as indicated at 90 in both of FIGS. 5 and 6. Since the data required for full vertical resolution has been stored on the hard disk 62, the two streams may be played back and interleaved to provide an interlaced 480-line display, as indicated at 92 in FIGS. 5 and 6 and as schematically illustrated in FIG. 7B.

Figure 7B:
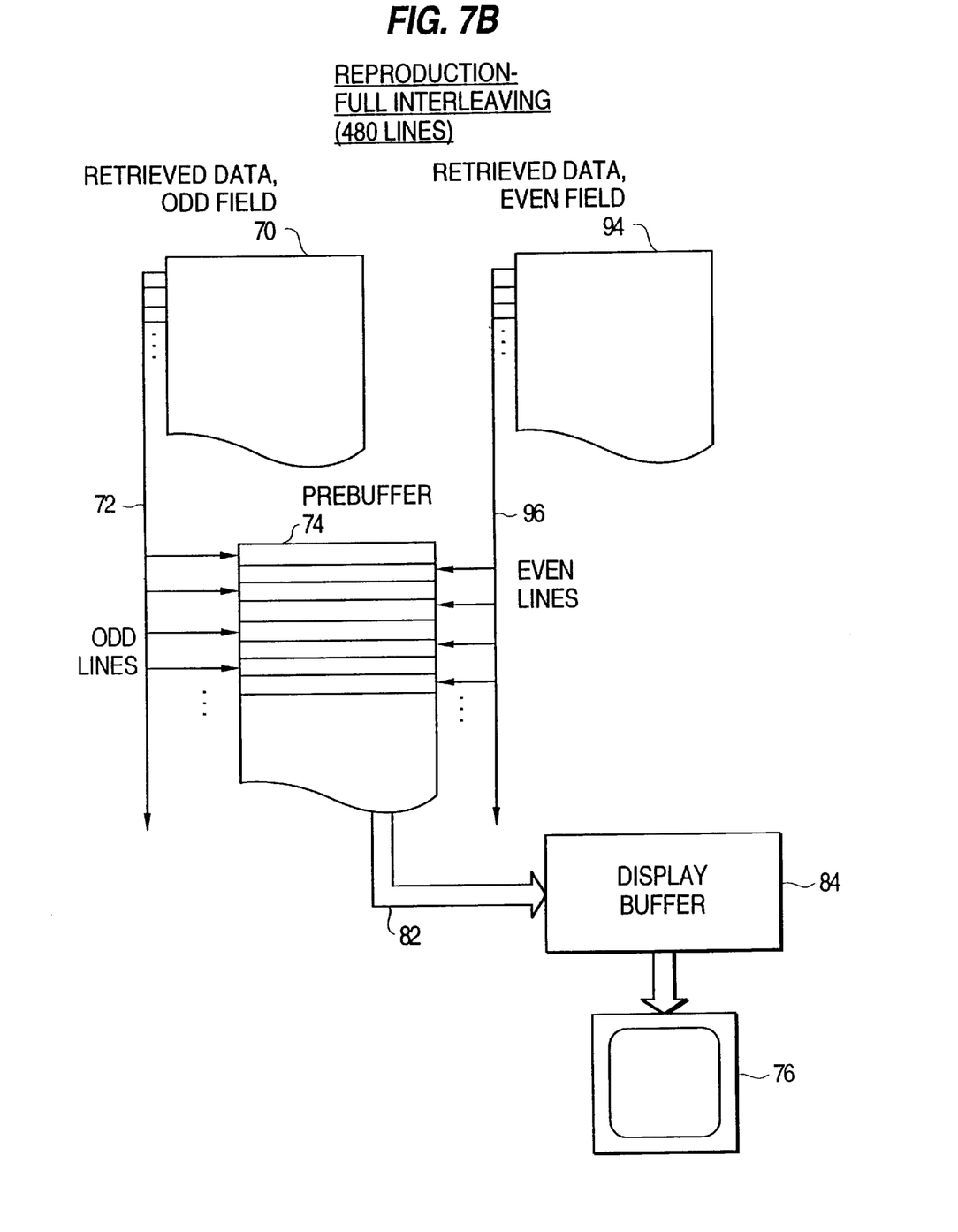
FIG. 7B is a schematic illustration of a high-resolution playback operation.

Referring, then, to FIG. 7B, it will be noted that the retrieved odd field data for camera X, again indicated at reference numeral 70, is still used to directly fill the odd lines of the pre-buffer 74. However, since even field data also has been retrieved, as indicated at 94, the even-field data is used to directly fill the pre-buffer slots corresponding to the even lines of the display (as indicated at 96). The data in the pre-buffer 74 is again mass-transferred to the display buffer 84, and then used to drive the monitor 76.

Figure 7C:
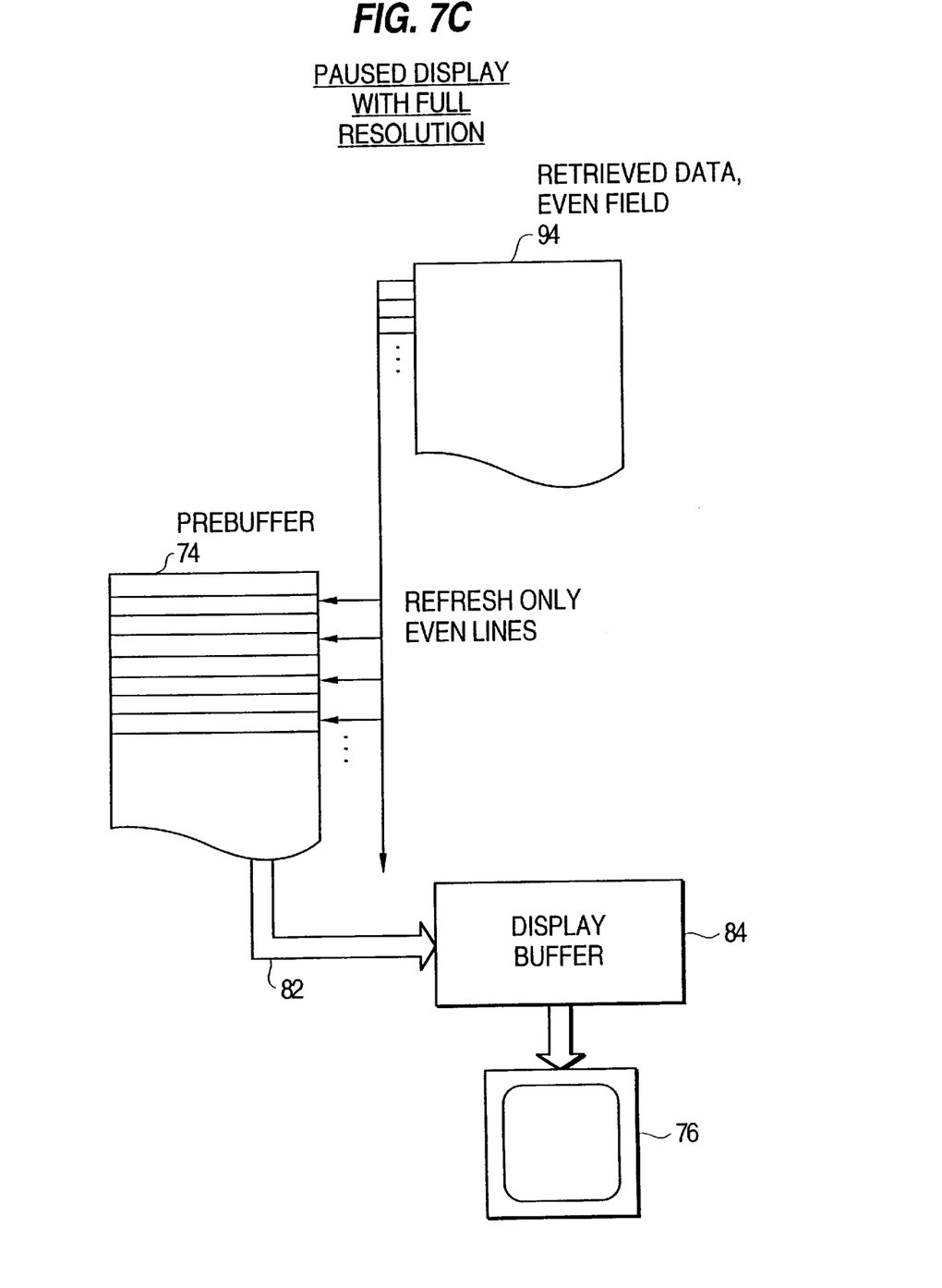
FIG. 7C is a schematic illustration of playback with full resolution in a pause mode.

Another playback option shown in FIGS. 5 and 6, which reduces the burden on the motherboard, can be referred to as a "halt and fill" technique (indicated at 98 in FIGS. 5 and 6). This technique entails playing back only one of the two camera X streams, and vertically interpolating to provide 480 lines (as in FIG. 7A) when playback is proceeding in either a forward or reverse direction with respect to the camera X stream. However, when a "pause" playback mode is initiated, wherein a single image from camera X is to be displayed on the display monitor for an extended period of time, the data to be displayed can be "filled out" so as to provide full vertical resolution. Assuming that the odd field data has been used to generate the interpolated image during the reverse or forward playback, then, as indicated in FIG. 7, when the pause mode is initiated, the interpolated data in the even-line memory locations of the pre-buffer 74 are replaced directly by retrieved even field data 94 for camera X to provide the fully-interlaced display that is continuously provided to refresh the display buffer for the monitor 76. With "halt and fill", the less burdensome "odd only" or "even" only display process is used during dynamic reproduction, for which the relatively low resolution is not likely to be noticed by the human operator. However, when the playback is "paused" to allow careful examination of a single image, a high-resolution image is then made available.

Figure 8:
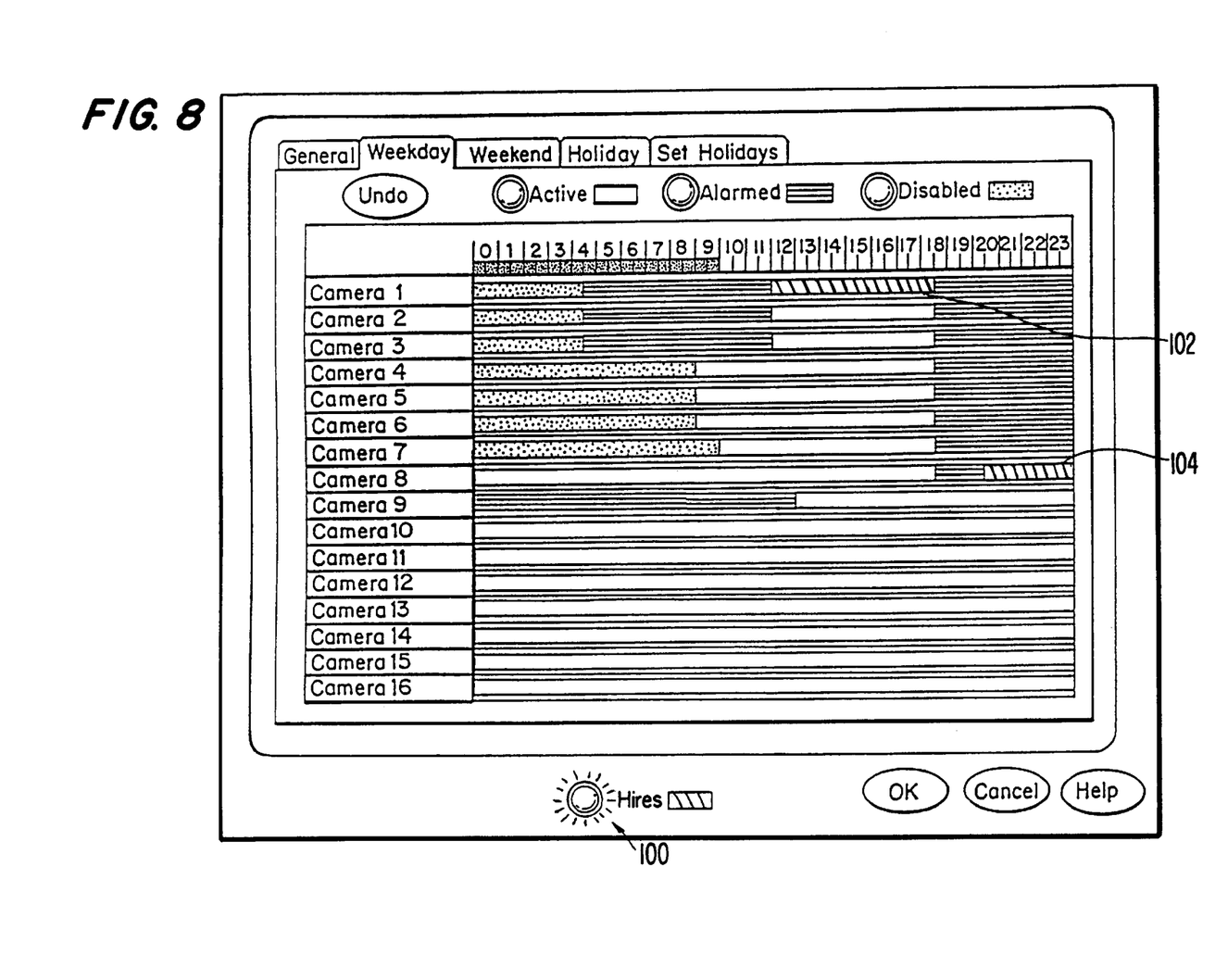
FIG. 8 is a screen display presented to the user to permit the user to schedule recording modes for each of a plurality of cameras.

FIG. 8 is a screen display that may be provided by the VR/PC unit, to indicate that a full resolution option is part of a recording mode scheduling function. Specifically, FIG. 8 should be understood to represent a "weekday" dialog display that can be utilized to schedule the recording status for 16 cameras connected to the VR/PC unit. In general, the format of the display in FIG. 8 is a bar chart, with horizontal bars displayed for each of the 16 cameras. Bars of different colors indicate different operating modes for the camera selected for respective portions of the 24-hour period. The bars can be manipulated by using a cursor (not shown) movable by means of a mouse (not shown) so as to stretch or shrink the bar, which has the effect of increasing or decreasing the scheduled period of time for the corresponding operating mode. The available operating mode options for each camera are "active" (ongoing recording), "alarmed" (recording only in the event an alarm condition is detected), "disabled" (no recording of the camera stream) and "high resolution" (indicated at 100). The "high resolution" mode is like the active mode, in that ongoing recording for a camera in that mode occurs even when no alarm condition which implicates that camera has been sensed. The difference between "active" and "high resolution" lies in the type and quantity of data recorded for the particular camera to which the mode is applied. In the "active" mode, either only the odd fields or only the even fields are recorded (as illustrated in FIG. 4, discussed above). In the "high resolution" mode, both odd and even fields are recorded for the same camera, so that full resolution images will be available upon reproduction (as in the techniques of FIGS. 5 or 6, discussed above).

Referring again to FIG. 8, it will be recognized that camera 1 has been scheduled for the "high resolution" mode for weekday afternoons (from noon to 6:30 p.m.), as indicated at 102. Similarly, the bar indicated at 104 shows that the high resolution mode has been selected for camera 8 during certain hours of the night (8:30 p.m. to midnight) during weekdays.

If one considers the recording mode to be implemented at 3 p.m. (15:00 hours) it will be recognized that all 16 cameras are in an active mode, except that camera 1 is also in a high resolution mode. Consequently, at 3 p.m. effectively 17 recording slots in sequence will be provided, including one slot in each cycle of the sequence for each of cameras 2–16, and two slots for camera 1 (one slot for the odd fields generated by camera 1, and one slot for the even fields).

Similarly, at 10 p.m. (22:00 hours) cameras 1 through 7 are subject only to "alarm recording" and 10 active recording slots are utilized, including one each for cameras 9–16 and two (one for odd fields and one for even fields) for camera 8.

Figure 9:
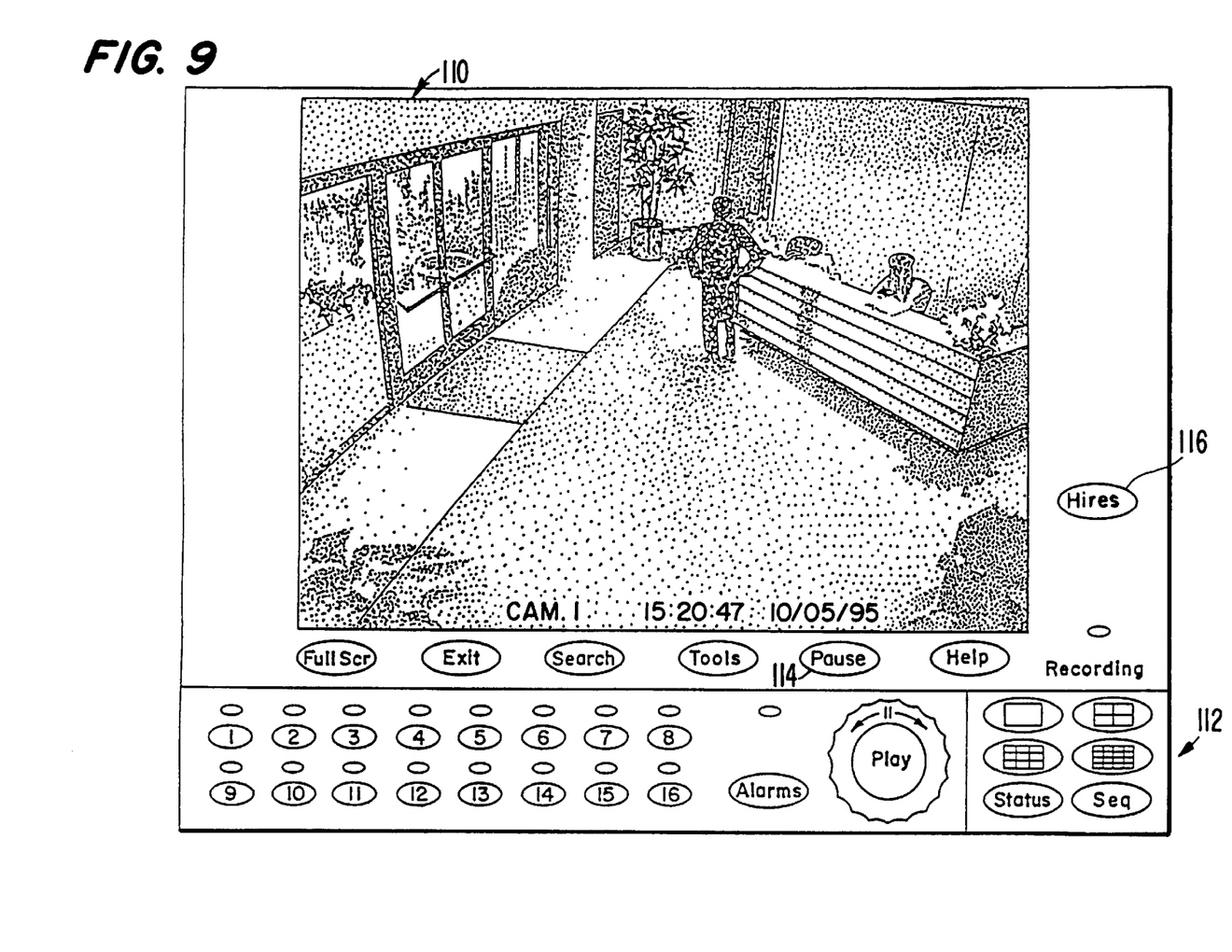
FIG. 9 is a screen display generated by the VR/PC unit when operating in a playback mode, and also having cursor-actuable control regions.

FIG. 9 shows a display format utilized when the VR/PC unit is operated in a playback mode. The screen display of FIG. 9 includes a window 110 in which a reproduced image or stream of images is displayed. In a lower portion 112 of the screen display of FIG. 9, a number of mouse-actuable virtual switch areas are provided. Functions of these switch areas are described in the above-referenced parent patent application.

The particular display screen example shown in FIG. 9 assumes that a forward or reverse direction playback mode is being carried out with standard resolution (i.e. 240 lines per screen). If the user wishes to actuate a pause mode in which the image screen is "frozen", the "pause" virtual switch indicated at 114 may be actuated using the mouse-driven cursor (not shown).

If the user wishes to have a high-resolution dynamic image reproduced instead of the standard resolution dynamic image, then the virtual switch labelled "HiRes" (reference numeral 16) may be actuated. It should be understood that when a high resolution reproduction mode is being carried out, the "HiRes" switch may be replaced with a virtual switch area for actuating the standard resolution playback mode, and bearing a legend such as "StdRes".

The video recording unit provided in accordance with the invention may be arranged or adapted to receive, record and display streams of video signals from cameras operating in any one of the standard video signal formats. These include the above-referenced NTSC format, as well as the PAL format and the SECAM format. It can be anticipated that, in most installations, all of the video signals provided to the recording unit will be in a single one of the standard formats.

It should be understood that the embodiments of the claimed invention disclosed above are to be taken as illustrative, and not limiting. The true spirit and scope of the invention are set forth in the following claims.

What is claimed is:

1. Apparatus for storing video signals, comprising:
   a first video camera;
   a second video camera;
   conversion means, connected to said video cameras, for selectively converting video signals generated by said video cameras into digital video signals;
   storage means, connected to said conversion means, for storing said digital video signals; and
   control means, connected to said conversion means and said storage means, for controlling said conversion means and said storage means; wherein:
   said video cameras each generate video signals according to an interlaced video signal standard in which said cameras each alternately generate odd signal fields and even signal fields, said odd signal fields corresponding to odd-numbered horizontal scan lines of an image plane and said even signal fields corresponding to even-numbered horizontal scan lines of said image plane; and
   said control means controls said conversion means and said storage means so that said storage means stores digital video signals representing both odd and even signal fields generated by said first video camera, and also stores only one of:
      (a) digital video signals representing exclusively odd signal fields generated by said second video camera; and
      (b) digital video signals representing exclusively even signal fields generated by said second video camera.

2. Apparatus according to claim 1, further comprising a third video camera connected to said conversion means and a fourth video camera connected to said conversion means, said third and fourth video cameras each generating video signals according to said interlaced video signal standard; and wherein said control means controls said conversion means and said storage means so that:
   said storage means stores only one of: (a) digital video signals representing exclusively odd signal fields generated by said third video camera; and (b) digital video signals representing exclusively even signal fields generated by said third video camera; and
   said storage means stores only one of: (a) digital video signals representing exclusively odd signal fields generated by said fourth video camera; and (b) digital video signals representing exclusively even signal fields generated by said fourth video camera.

3. Apparatus according to claim 1, wherein said storage means includes a hard disk.

4. Apparatus according to claim 1, wherein said control means includes a microprocessor mounted on a motherboard and connected to transmit control signals to said conversion means and to said storage means.

5. A method of operating a digital video signal storage device, said device being connected to a plurality of video cameras, each of said cameras generating video signals according to an interlaced video signal standard in which said cameras each alternately generate odd signal fields and even signal fields, said odd signal fields corresponding to odd-numbered horizontal scan lines of an image plane and said even signal fields corresponding to even-numbered horizontal scan lines of said image plane, the method comprising the steps of:
   storing in said storage device digital signals corresponding to both odd signal fields and even signal fields generated by a first one of said plurality of video cameras; and
   storing in said storage device only one of:
      (a) digital signals corresponding to odd signal fields generated by a second one of said plurality of video cameras; and
      (b) digital signals corresponding to even signal fields generated by said second one of said plurality of video cameras.

6. A method according to claim 5, wherein said storage device is a hard disk.

7. A method of operating a digital video signal storage device, said device being connected to a plurality of video cameras, said cameras each generating video signals corresponding to an image plane, the method comprising the steps of:
   storing in said storage device first digital signals representing video signals generated by a first one of said video cameras, said first digital signals providing a vertical resolution for said image plane corresponding to a first number of horizontal scan lines;

storing in said storage device second digital signals representing video signals generated by a second one of said video cameras, said second digital signals providing a vertical resolution for said image plane corresponding to a second number of horizontal scan lines that is substantially one-half of said first number of scan lines; and refraining from storing in said storage device any digital signal corresponding to video signals generated by said second one of said video cameras, other than said second digital signals.

8. A method according to claim 7, wherein all of said video cameras generate respective video signals in accordance with the NTSC video signal standard.

9. A method according to claim 7, wherein said first number of horizontal scan lines is substantially 480 lines, and said second number of horizontal scan lines is substantially 240 lines.

10. A method according to claim 7, wherein all of said video cameras generate respective video signals in accordance with the PAL video signal standard.

11. A method according to claim 7, wherein all of said video cameras generate respective video signals in accordance with the SECAM video signal standard.

12. A method according to claim 7, wherein said storing steps include storing both said first digital signals and said second digital signals on the same hard disk.

13. Apparatus for storing video signals, comprising:

a plurality of video cameras, including at least four video cameras;

first, second and third video decoding circuits each for receiving a field of video signals generated by a respective one of said video cameras connected to the video decoding circuit and for extracting luminance, chrominance and reference signal components from the received video signal;

means for selectively connecting each of said video decoding circuits to every one of said plurality of video cameras;

first and second signal conversion circuits, each for converting into digital form the luminance and chrominance signal components extracted by a respective one of said video decoding circuits currently connected to the signal conversion circuit;

means for selectively connecting each of said signal conversion circuits to every one of said first, second and third video decoding circuits;

first storage means connected to said first signal conversion circuit for sequentially storing fields of said luminance and chrominance signal components converted into digital form by said first conversion circuit; and second storage means connected to said second signal conversion circuit for sequentially storing fields of said luminance and chrominance signal components converted into digital form by said second conversion circuit;

said apparatus being selectively operable in either one of a first mode and a second mode, wherein:

in said first mode, one of said video decoding circuits receives two consecutive fields generated by one of said video cameras, said two consecutive fields consisting of a field corresponding to odd-numbered horizontal scan lines in an image plane and a field corresponding to even-numbered scan lines in the image plane; and in said second mode, said one of said video decoding circuits receives a sequence of fields generated by said video cameras such that no two consecutive fields of said sequence are generated by a single one of said video cameras.

14. A digital video recorder connected to a plurality of video cameras and including a storage device, wherein first and second streams of digital video signals are stored in said storage devices, said first and second streams being stored and indexed separately from each other, said first and second streams both corresponding to video signals generated by a single one of said video cameras, said first stream corresponding to video signal fields which represent odd-numbered horizontal scan lines in an image plane and said second stream corresponding to video signal fields which represent even-numbered horizontal scan lines in said image plane.

15. A digital video recorder according to claim 14, wherein said storage device is a hard disk.

16. A digital video recorder according to claim 14, further comprising display means for selectively displaying a sequence of images corresponding to at least one of said stored first and second streams of digital video signals; said recorder being selectively operable in a first mode in which said sequence of images is formed by interpolating only one of said stored first and second streams, and a second mode in which said sequence of images is formed by interlacing respective images from said stored first and second streams.

17. A digital video recorder according to claim 16, wherein said recorder operates in said second mode for displaying in a paused playback mode a stored image generated by said one of said video cameras.

18. A digital video recorder according to claim 17, wherein said recorder operates in said first mode for displaying one of said stored streams of images in a forward- or reverse-direction playback mode.

* * * * *